United States Patent
Gardner et al.

(10) Patent No.: US 11,525,803 B2
(45) Date of Patent: Dec. 13, 2022

(54) IONIZATION FOR TANDEM ION MOBILITY SPECTROMETRY

(71) Applicant: Hamilton Sundstrand Corporation, Charlotte, NC (US)

(72) Inventors: Benjamin D. Gardner, Colton, CA (US); Gary A. Eiceman, Las Cruces, NM (US); Hsien-Chi W. Niu, Rowland Heights, CA (US); Peter Fowler, Las Cruces, NM (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 215 days.

(21) Appl. No.: 17/027,063

(22) Filed: Sep. 21, 2020

(65) Prior Publication Data

US 2021/0088474 A1 Mar. 25, 2021

Related U.S. Application Data

(60) Provisional application No. 62/903,479, filed on Sep. 20, 2019.

(51) Int. Cl.
*G01N 27/622* (2021.01)
*H01J 49/00* (2006.01)
*H01J 49/16* (2006.01)

(52) U.S. Cl.
CPC ........ *G01N 27/622* (2013.01); *H01J 49/0031* (2013.01); *H01J 49/0059* (2013.01);
(Continued)

(58) Field of Classification Search
CPC ... G01N 27/622; G01N 27/64; H01J 49/0031; H01J 49/0059; H01J 49/0081; H01J 49/162; H01J 2237/0822
(Continued)

(56) References Cited

U.S. PATENT DOCUMENTS

2003/0209665 A1 11/2003 Losch et al.
2015/0129760 A1* 5/2015 Beil .............. G01N 27/622
250/281
(Continued)

FOREIGN PATENT DOCUMENTS

CN 101413919 A 4/2009
CN 103163206 A 6/2013
(Continued)

OTHER PUBLICATIONS

Extended European Search Report dated Feb. 15, 2021, issued during the prosecution of European Patent Application No. 20197248.6.

*Primary Examiner* — Kiet T Nguyen
(74) *Attorney, Agent, or Firm* — Locke Lord LLP; Joshua L. Jones; Scott D. Wofsy

(57) ABSTRACT

An ion-mobility spectrometer system includes a housing with an upstream end, a downstream end, and a drift region defined along a longitudinal axis through the housing between the upstream and downstream ends. A first ionizer is operatively connected the housing to supply ions at the upstream end. A second ionizer is operatively connected to the housing to supply ions at the upstream end, wherein the first and second ionizers are both situated upstream of the drift zone relative to an ion flow path through the drift zone. An electric field generator is operatively connected to the housing to drive ions through the drift zone in a direction from the upstream end toward the downstream end. The second ionizer is a radioactive ionizer mounted to the housing at the upstream end positioned to direct irradiated ions into the housing.

8 Claims, 1 Drawing Sheet

(52) U.S. Cl.
CPC ........ *H01J 49/0081* (2013.01); *H01J 49/162* (2013.01); *H01J 2237/0822* (2013.01)

(58) Field of Classification Search
USPC ........................................................ 250/286
See application file for complete search history.

(56) References Cited

U.S. PATENT DOCUMENTS

| | | |
|---|---|---|
| 2016/0129760 A1 | 5/2016 | Mirzaei et al. |
| 2017/0140910 A1 | 5/2017 | Brown et al. |
| 2017/0309465 A1 | 10/2017 | Jarrell |
| 2019/0180994 A1 | 6/2019 | Makarov |

FOREIGN PATENT DOCUMENTS

| | | |
|---|---|---|
| DE | 10042394 A1 | 4/2002 |
| JP | 5125248 B2 | 1/2013 |
| WO | 2018091910 A1 | 5/2018 |

* cited by examiner

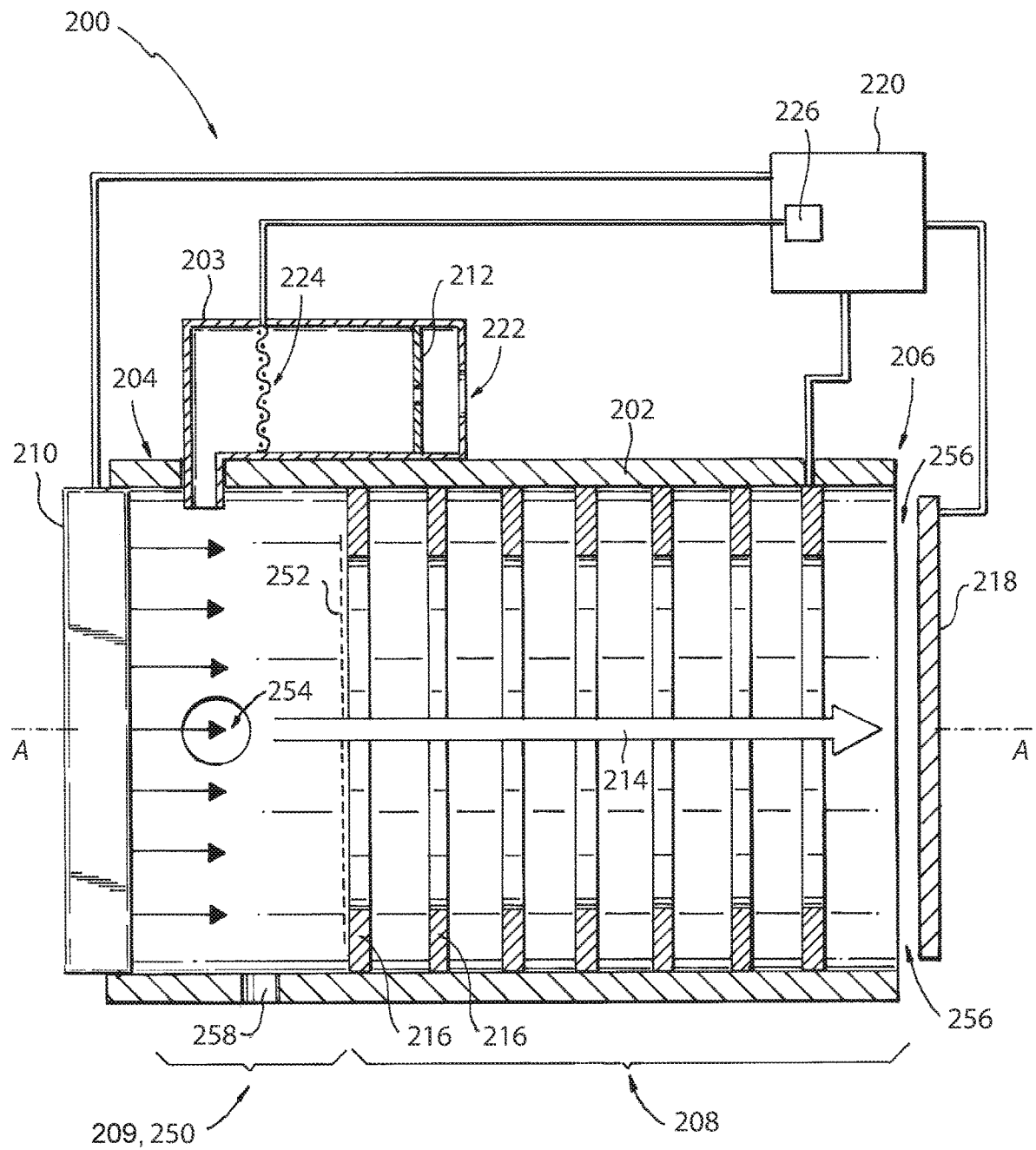

IONIZATION FOR TANDEM ION MOBILITY SPECTROMETRY

CROSS REFERENCE TO RELATED APPLICATIONS

This application claims the benefit of priority to U.S. Provisional Patent Application No. 62/903,479, filed Sep. 20, 2019. The entire contents of this application are incorporated herein by reference.

STATEMENT REGARDING FEDERALLY SPONSORED RESEARCH OR DEVELOPMENT

This invention was made with government support under contract number FA8650-17-C-9101 awarded by the Department of Homeland Security. The government has certain rights in the invention.

BACKGROUND

1. Field

The present disclosure relates to spectrometry, and more particularly to ion-mobility spectrometry.

2. Description of Related Art

Ion-mobility spectrometers ionize gas-phase molecules, e.g., using a radioactive source located at the beginning of an analyzer flight tube. A population of these ions is then driven toward a detector. An electric field forces the ions forward through an opposing gas bath (the buffer gas) at atmospheric pressure. The time required to reach the detector is a function of ion mass to charge ratio (m/z) and collision cross-section, which together form a term known as Ko. This function is characteristic for a given ion.

The conventional techniques have been considered satisfactory for their intended purpose. However, there is an ever present need for improved systems and methods for spectrometry. This disclosure provides a solution for this need.

SUMMARY

An ion-mobility spectrometer system includes a housing with an upstream end, a downstream end, and a drift region defined along a longitudinal axis through the housing between the upstream and downstream ends. A tandem ion source is included at the upstream end of the housing. The tandem ion source includes a first ionizer that is operatively connected the housing to supply ions at the upstream end, and a second ionizer that is operatively connected to the housing to supply ions at the upstream end. The first and second ionizers are both situated upstream of the drift zone relative to an ion flow path through the drift zone. An electric field generator is operatively connected to the housing to drive ions through the drift zone in a direction from the upstream end toward the downstream end. A detector is mounted at the downstream end of the housing for detecting ions from the drift zone reaching the detector. The second ionizer is a radioactive ionizer mounted to the housing at the upstream end positioned to direct irradiated ions radially into the housing relative to the longitudinal axis.

The first and second ionizers can both be located upstream of the electric field generator without any electric field generator between the first and second ionizers. The electric field generator can include a series of annular electrodes spaced apart axially along the drift zone, with a flow path for ions defined therethrough, wherein none of the annular electrodes is located between the first and second ionizers. The first ionizer can be a photoionizer/photofragmenter mounted to the housing on an upstream side of the drift zone, positioned to direct photons axially into the housing along the longitudinal axis. The second ionizer can be a $^{63}$Ni ionizer. The $^{63}$Ni ionizer can be mounted in a side passage of the housing that includes a gas inlet upstream of the $^{63}$Ni ionizer, wherein the side passage meets the ion flow path in a radial direction. A wire grid can traverse the side passage downstream of the $^{63}$Ni ionizer, wherein the wire grid is connected to a power circuit as an electrode, and the power circuit includes a switch for selectively activating and deactivating ion flow from the $^{63}$Ni ionizer.

A method of ion-mobility spectrometry includes continuously ionizing molecules in an ionization zone with an ionizer upstream of a drift zone, directing photons from a photoionizer/photofragmenter into the ionization zone, wherein the photoionizer/photofragmenter is located upstream of the drift zone, driving ions generated by the ionizer and the photoionizer/photofragmenter through the drift zone with an electrical field, and selectively counteracting the ionizer with a wire grid electrode so that only the photoionizer/photofragmenter ionizes. The method includes detecting ions reaching a detector downstream of the drift zone to identify analytes in the ions.

Directing photons from the photoionizer/photofragmenter can include fragmenting ions ionized by the ionizer. Directing photons from the photoionizer/photofragmenter can include ionizing molecules that the ionizer cannot effectively ionize. The method can include deactivating the photoionizer/photofragmenter so that only the ionizer ionizes. The method can include activating and deactivating the photoionizer/photofragmenter at a rate that is faster than an expected dwell time of a predetermined analyte.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 1 is a schematic view of an embodiment of a system constructed in accordance with the present disclosure, showing an on axis photoionizer/photofragmenter.

DETAILED DESCRIPTION OF THE PREFERRED EMBODIMENTS

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 200. The systems and methods described herein can be used to improved operability options and signal to noise ratio in spectrometry. Systems and method disclosed herein provide for a single ion source having multiple ionizers in tandem with one another, each capable of causing the formation of ions.

The ion-mobility spectrometer system 200 includes a housing 202 with an upstream end 204, a downstream end 206, and a drift region 208 defined along a longitudinal axis A through the housing 202 between the upstream and downstream ends 204, 206. A tandem ion source 209 is provided at the upstream end 204 of the housing 202. The tandem ion source 209 incudes a first ionizer 210 that is operatively connected the housing 202 to supply ions at the upstream end 204, and a second ionizer 212 that is operatively connected to the housing 202 to also supply ions at the upstream end 204. The first and second ionizers 210, 212 are both situated to generate ions in an ionization zone 250 that is upstream of the drift zone 208 relative to an ion flow path 214 through the drift zone 204. An electric field generator 216 is operatively connected to the housing 202 to drive ions through the drift zone 208 in a direction from the upstream end 204 toward the downstream end 206. The electric field generator 216 includes a series of annular electrodes spaced apart axially along the drift zone 208, with a flow path 214 for ions defined therethrough. While there is a specific number of electrodes 216 shown in FIG. 1, this is only schematic as those skilled in the art will readily appreciate that any suitable number of annular electrodes can be used. Those skilled in the art will readily appreciate that while not shown for sake of conciseness in the drawing, the electric field generator 216 includes a power supply connected to the annular electrodes. A detector 218 is mounted at the downstream end 206 of the housing 202 for detecting ions from the drift zone 208 reaching the detector 218. The detector 218 is connected to a controller 220, which receives data from the detector 218, and includes machine readable instructions including algorithms to infer the presence of given analytes in the ion stream based on the timing of ion impact detected by the detector 218. The controller 220 is also connected to control the second ionizer 212 and the electric field generator 216. An ion shutter 252 is included on the upstream-most one of the electrodes 216 to control timing of release of ions into the drift zone 214. While the connection is not shown for sake of clarity in the drawing, those skilled in the art will readily appreciate that the ion shutter 252 is operatively connected to be controlled by the controller 220 for coordination of the ion shutter 252 with the detector 218.

The first and second ionizers 210, 212 are both located upstream of the electric field generator 216 without any intervening components of the electric field generator located 216 axially between the first and second ionizers 210, 212. This provides for the ionization zone 250 in the housing 202 to be fully upstream of the electric field generator 216, i.e., without any intervening components of the electric field generator 216 in the ionization zone. None of the annular electrodes of the electric field generator 216 is located axially between the first and second ionizers 210, 212. None of the electrodes 216 is in the ionization zone 250.

The housing 202 includes a sample inlet 254 where a sample analyte can be introduced into the ionization zone 250. A buffer gas flow inlet 256 and gas flow outlet 258 in the housing provide for a flow of gas through the drift zone 214 that flows in a direction opposite that of the ion flow through the drift zone 214. An additional gas inlet 222 is provided for gas flow through the second ionizer 212. Those skilled in the art will readily appreciate that while not depicted, a gas pump can be connected in fluid communication with the gas flow inlet 256 and/or gas flow outlet 258 to drive the gas flow through the housing.

The first ionizer 210 is a photoionizer/photofragmenter mounted to the housing 202 on an upstream side of the drift zone 208, positioned to direct photons axially into the housing 202 along the longitudinal axis A, as indicated in FIG. 1 with the arrows emanating from the first ionizer 210. The first ionizer 210 can operate as a photoionizer or as a photofragmenter, controlled according to the goal of the experiment or application, depending on which analytes are present, as well as photon density.

The second ionizer 212 is mounted in a side passage 203 of the housing 202 that includes the gas inlet 222 upstream of the second ionizer 212, wherein the side passage 203 meets the ion flow path 214 of the drift zone 208 in a radial direction. A wire grid 224 traverses the side passage 203 downstream of the second ionizer 212. The wire grid 224 is connected to a power circuit of the controller 220 as an electrode. The power circuit includes a switch 226 for selectively activating and deactivating ion flow from the second ionizer 212 by activating the wire grid 224 to prevent or deactivate ion flow by capturing ions on the wire grid 224, and deactivating the wire grid 224 to activate or allow ion flow. The controller 220 is also connected to the detector 218 as described above with respect to controller 220 and detector 218, as well as to control the inlet 222, e.g. using a valve and/or pump, photoionizer/photofragmenter, and the electric field generator 216. With two ionizers 210, 212 upstream of the drift zone 208, the two ionizers 210, 212 can provide tandem ionization/fragmentation for operational modes such as those described below.

A method of ion-mobility spectrometry includes continuously ionizing molecules in an ionization zone (e.g. ionization zone 250) with an ionizer (e.g. ionizer 212) upstream of a drift zone (e.g. drift zones 208), directing photons from a photoionizer/photofragmenter (e.g. photoionizer/photofragmenter 210) into the ionization zone, wherein the photoionizer/photofragmenter is located upstream of the drift zone, and driving ions generated by the ionizer and the photoionizer/photofragmenter through the drift zone with an electrical field (e.g. generated by electric field generator 216). The method includes detecting ions reaching a detector (e.g. detector 218) downstream of the drift zone to identify analytes in the ions.

Directing photons from the photoionizer/photofragmenter can include fragmenting ions ionized by the ionizer, or ionizing molecules that the ionizer cannot effectively ionize, depending on the analytes present, and the amount of photon energy applied. The method can include counteracting the ionizer, e.g. (ionizer 212) with a wire grid electrode (e.g. wire grid 224) so that only the photoionizer/photofragmenter ionizes molecules. The method can include deactivating the photoionizer/photofragmenter (e.g. using controller 120, 220 and/or the switch 226) so that only the ionizer ionizes molecules. The method can include activating and deactivating the photoionizer/photofragmenter at a rate that is faster than an expected dwell time of a predetermined analyte.

Systems and method disclosed herein provide for a single ion source having multiple ionizers in tandem with one another, each capable of causing the formation of ions. With two tandem ionizers as disclosed herein, it is possible to use a radioactive ionizer to continuously ionize molecules as they enter the ionizer. The photoionizer/photofragmenter can be used periodically to cause some of the ions to fragment, e.g. by turning the photoionizer/photofragmenter on and off at a rate that is faster than the expected dwell time of a particular analyte of interest. As a result, two types of data are generated for each analyte: one containing ionization information only, and one comprising a mixed spectrum of both ionization and fragmentation information. Deconvolution of the ionization data from the mixed data provides information about the fragments.

In another mode, the photoionizer/photofragmenter is used to perform initial ionization, e.g. for certain classes of compounds such as hydrocarbons where it is know that $^{63}$Ni does not efficiently ionize, for example, but where photoionization does efficiently ionize. Pulsed photoionization can be used to supplement $^{63}$Ni ionization to reveal that certain compounds are not being efficiently ionized by the $^{63}$Ni ionization and are likely hydrocarbons, for example.

In another mode, any two ionization/fragmentation devices could be used in a tandem combination to ensure that ionization occurs across a wide range of compound classes, e.g., using one ionizer or the other, or both.

While described above with a photoionizer/photofragmenter, those skilled in the art will readily appreciate that any suitable type of ionizer/photofragmenter can be used without departing from the scope of this disclosure. Similarly, while described above with a $^{63}$Ni ionizer, those skilled in the art will readily appreciate that any other suitable type or shape of ionizer, e.g. grid shaped, cylinder shaped, tritium, or the like, can be used without departing from the scope of this disclosure. It is also contemplated that systems and methods as described herein can be used for the fragmentation of ions that have been externally generated (i.e. outside the ion source).

Potential advantages of systems and methods as disclosed herein include tandem operation of ionizers using pulsed operation. Additional potential advantages include simple geometry for the ion mobility cell by eliminating the traditional second cell, and capability for increased ionization efficiency of a broad compound class range.

The methods and systems of the present disclosure, as described above and shown in the drawings, provide for improved operability options and signal to noise ratio in spectrometry. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An ion-mobility spectrometer system, comprising:
   a housing with an upstream end, a downstream end, and a drift zone defined along a longitudinal axis through the housing between the upstream and downstream ends;
   a tandem ion source at the upstream end of the housing, wherein the tandem ion source includes:
   a first ionizer operatively connected to the housing to supply ions at the upstream end; and
   a second ionizer operatively connected to the housing to supply ions at the upstream end, wherein the first and second ionizers are both situated upstream of the drift zone relative to an ion flow path through the drift zone;
   an electric field generator operatively connected to the housing to drive ions through the drift zone in a direction from the upstream end toward the downstream end; and
   a detector mounted at the downstream end of the housing for detecting ions from the drift zone reaching the detector, wherein the second ionizer is a radioactive ionizer mounted to the housing at the upstream end and positioned to direct irradiated ions into the housing, wherein the first ionizer source is a photoionizer/photofragmenter mounted to the housing on an upstream side of the drift zone, positioned to direct photons axially into the housing along the longitudinal axis, wherein the second ionizer is a $^{63}$Ni ionizer, wherein the $^{63}$Ni ionizer is mounted in a side passage of the housing that includes a gas inlet upstream of the $^{63}$Ni ionizer, wherein the side passage meets the ion flow path in a radial direction; and
   a wire grid traversing the side passage downstream of the $^{63}$Ni ionizer, wherein the wire grid is connected to a power circuit as an electrode, and wherein the power circuit includes a switch for selectively activating and deactivating ion flow from the $^{63}$Ni ionizer.

2. The system as recited in claim 1, wherein the first and second ionizers are both located upstream of the electric field generator without any electric field generator between the first and second ionizers.

3. The system as recited in claim 1, wherein the electric field generator includes a series of annular electrodes spaced apart axially along the drift zone, with a flow path for ions defined therethrough, wherein none of the annular electrodes is located between the first and second ionizers.

4. A method of ion-mobility spectrometry, comprising:
   continuously ionizing molecules in an ionization zone with an ionizer upstream of a drift zone;
   directing photons from a photoionizer/photofragmenter into the ionization zone, wherein the photoionizer/photofragmenter is located upstream of the drift zone;
   driving ions generated by the ionizer and the photoionizer/photofragmenter through the drift zone with an electrical field;
   selectively counteracting the ionizer with a wire grid electrode so that only the photoionizer/photofragmenter ionizes molecules; and
   detecting ions reaching a detector downstream of the drift zone to identify analytes in the ions.

5. The method as recited in claim 4, wherein directing photons from the photoionizer/photofragmenter includes fragmenting ions ionized by the ionizer.

6. The method as recited in claim 5, wherein directing photons from the photoionizer/photofragmenter includes ionizing molecules that the ionizer cannot effectively ionize.

7. The method as recited in claim 5, further comprising deactivating the photoionizer/photofragmenter so that only the ionizer ionizes molecules.

8. The method as recited in claim 7, further comprising activating and deactivating the photoionizer/photofragmenter at a rate that is faster than an expected dwell time of a predetermined analyte.

* * * * *